May 12, 1964 L. KATZ 3,132,523

TEMPERATURE CONTROL SYSTEM

Filed Feb. 15, 1962

INVENTOR
LEONHARD KATZ

ATTORNEYS

AGENT

United States Patent Office

3,132,523
Patented May 12, 1964

3,132,523
TEMPERATURE CONTROL SYSTEM
Leonhard Katz, Woburn, Mass., assignor, by mesne assignments, to the United States of America as represented by the Secretary of the Navy
Filed Feb. 15, 1962, Ser. No. 173,591
5 Claims. (Cl. 74—5)

The present invention relates generally to gyroscopic systems and more particularly to a means for controlling the operating temperature of gyroscopic systems.

This invention is mainly concerned with temperature control systems for gyroscopes, especially floating gyroscopes. As is well known in the art, the characteristic feature of a floating gyroscope, from which they derive their name, is a float assembly which contains the gyroscopic spin rotor. This float assembly is supported with substantially neutral buoyancy in a dense viscous liquid. Gyros of this type are very resistant to vibration and can withstand stringent environmental conditions by reason of floating substantially all of the weight of the wheel assembly. Jewelled bearings are commonly used to guide the float but need support only a small portion of its mass.

Notwithstanding their relative immunity to shock and vibrations, gyros of this type can also be made extremely sensitive. When the utmost in sensitivity and precision is desired from such gyroscopes, it is necessary to consider minor imperfections in the supporting fluid. Both the density and the viscosity of the fluid will vary with the ambient temperature. Accordingly, if there are temperature variations from place to place within the gyroscope and particularly within the damping clearance around the float, these variations will exert a torque on the gyroscope which will cause it to give a false signal.

Heretofore, it has been the practice to enclose within the gyro casing temperature sensitive thermistors to measure the temperature at various points within the gyro and to apply electrical heater windings to the outer surfaces of the gyro to control the temperature distribution within it using the thermistor temperature sensors with individual temperature control circuits and regulators for each gyroscope.

It has been the general practice in the art to have a typical accelerometer and gyro package for inertial guidance consist of six such gyros on the control member of the guidance system. Three of these six gyros are required to establish angular orientation in space and the three additional gyros are incorporated as components of pendulous integrating gyro accelerometers which sense changes in the three position coordinates.

It can therefore be readily seen that providing individual temperature control apparatus for each of the six gyroscopes with all the necessary leads and wires being carried outward through the various successive gimbals would tend to add substantially to the complexity of an actual practical guidance system using the prior art methods of temperature control.

An object of the present invention is the provision of a simple temperature control system for a plurality of gyroscopes.

Another object of the invention is the provision of a temperature control system which is superior to that afforded by the more complex systems of the prior art.

Still another object is to provide a means for maintaining the fluid within the floating gyros at an optimum operating density and viscosity.

A further object of the invention is to provide a temperature control system which eliminates the need for individual temperature control circuits and regulators for each gyroscope.

Other objects and many of the attendant advantages of this invention will be readily appreciated as the same becomes better understood by reference to the following detailed description when considered in connection with the accompanying drawings wherein.

Figure 1:
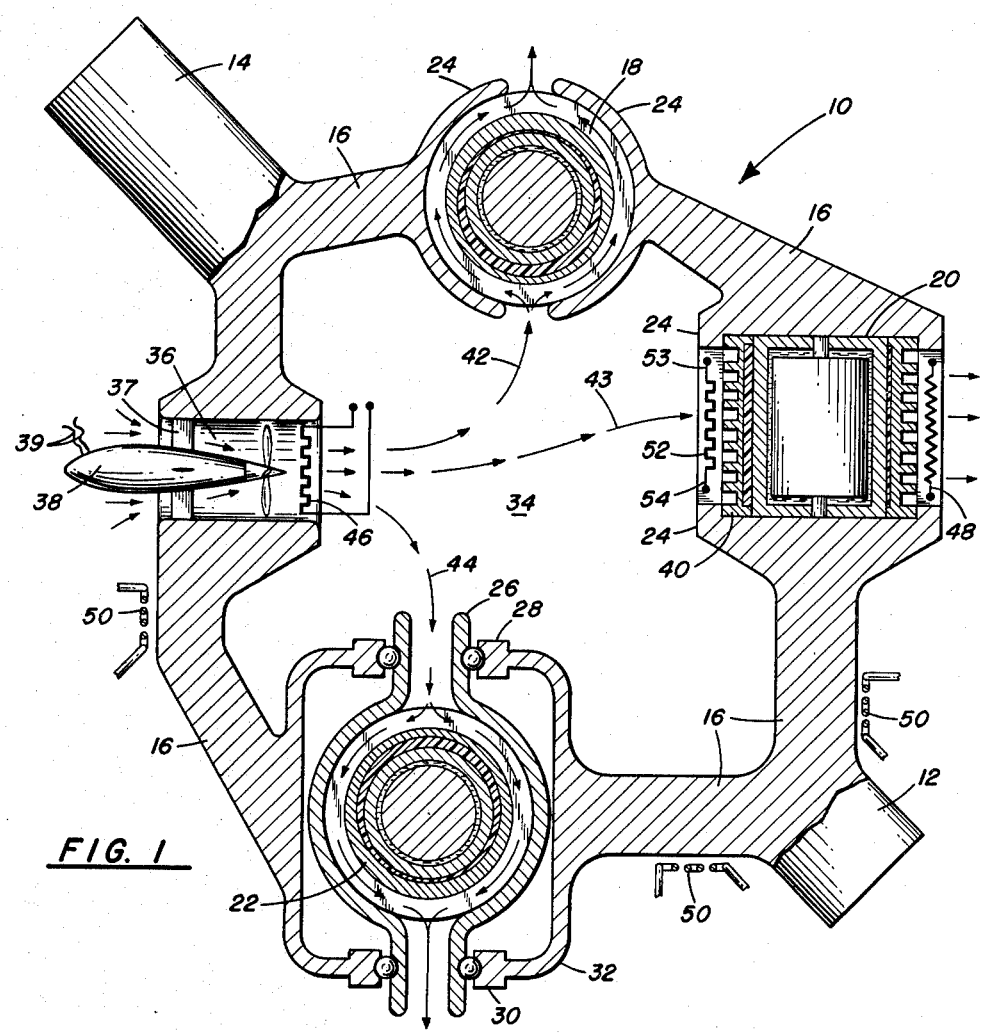
FIG. 1 illustrates a cross-sectional view of a stabilized member of a guidance system based on floating integrating gyros.

Referring now to the drawings, wherein like reference characters designate like or corresponding parts throughout the several views, there is shown in FIG. 1, which illustrates a preferred embodiment of the invention, a cross-section of a stabilized member 10 of a typical guidance system employing floating integrating gyroscopes. Normally, six gyros would be employed in the typical guidance system, however, only three are being shown for simplicity purposes.

Stabilized member 10 preferably in the form of a symmetrical hexahedron houses an assembly which normally contains six gyroscopes (one in each face, three being shown in FIG. 1) which are supported within the gymbal system by the stub shafts 12 and 14 which are integral with the casting body 16 and protrude from opposite corners of the hexahedral body. Shown in this sectional view are two inertial reference integrating gyros (IRIG's) 18 and 20, which are illustrated as being mounted perpendicular to each other. There is also shown one pendulous integrating gyro accelerometer (PIGA), unit 22. For all practical purposes, both the IRIG's 18 and 20 and the PIGA 22 may be considered to contain the gyro units which have thermal properties as shown in U.S. Patent 3,004,436.

The IRIG units, 18 and 20, are rigidly attached to the casting body 16. The supporting portions 24 are shown as being integral with the casting 16, however, other means may be provided for securing the units 18 and 20 to the casting 16. The pendulous integrating gyro unit 22 is, however, carried in the trunnion assembly 26 which is free to rotate on trunnion bearings 28 and 30, which locate the trunnion within the PIGA housing 32. The pendulous integrating gyro accelerometer is well known in the art and was used to a large extent on the V-2 rockets. Casting 16 is also provided with an intake opening 36 through which air may be drawn by fan 38.

When the IRIG's, 18 and 20, the PIGA, 22, are assembled and mounted in the casting body 16 they enclose a plenum chamber 34. A fan 38, supported by struts 37, is mounted in the air intake opening 36 and constantly blows air into the plenum chamber 34. Electrical leads 39 provide the necessary current for fan 38. The air is constrained to leave chamber 34 only through the heat exchanger units 40 in the various gyro assemblies. The paths which the air may take through stabilized member 10 are indicated by the arrow paths 42, 43 and 44 indicating the flow of air through the IRIG 18, IRIG 20 and PIGA 22 assemblies. The air intake to the PIGA 22 is through trunnion assembly 26. Air entering the plenum chamber 34 passes over an electrical heater 46. The principal temperature control of the assembly is effected by control of heater 46 which is based upon a sensor of the outlet temperature measured at the outlet of the gyroscope most critical to the function of the system. A resistance wire thermometer 48 is shown at the output of the IRIG 20 and is representative of the control sensor. Depending upon the temperature measured by the sensor 48, the heater 46 will either be energized or de-energized to maintain the desired outlet temperature. Additional heater windings 50 are distributed about the outer surface of the casting body 16 in such a manner that, in normal operation within a controlled temperature atmosphere, the casting 16 will maintain a substantially uniform temperature equal to the operating temperature of the gyros as explained above.

In spite of care in locating the heaters 50, it might be found that the temperature of the outlet air at the various gyros is not precisely the desired temperature. In order to equalize the temperature between the gyros, auxiliary heaters 52 may be provided at the air inlet to each of the various gyro heat exchangers. (One such auxiliary heater element shown at 52.) Auxiliary heater 52 is connected by leads 53 and 54 to a source of variable current as shown at the inlet of IRIG 20. Similar heaters could be provided at the inlet to the other gyroscopes if found to be necessary.

Figure 2:
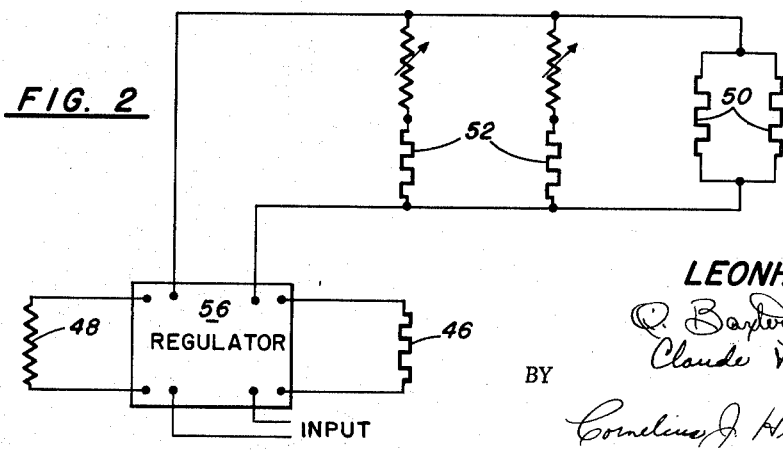
FIG. 2 is a schematic of the electrical circuit used in the temperature control system of FIG. 1.

FIG. 2 is a schematic of the electrical circuit necessary to accomplish the desired temperature control in accordance with the present invention. As shown in FIG. 2, regulator 56 controls the heater 46 in response to the temperature sensor 48. Auxiliary heaters 50 and 52 are also shown in this figure.

In order to clearly set forth the invention and its operation, a brief discussion of its operation follows:

As pointed out earlier in the specification, the maintenance of a uniform operating temperature within a gyro assembly is most desirable to obtain error free signals from the various gyros. In order to maintain a uniform temperature within the casing of the gyro assembly the regulator 56 is provided. The desired operating temperature at which the gyros are to be maintained is set on regulator 56. Temperature sensor 48 senses the outlet temperature of the air leaving the gyro assembly. If the temperature of the air at the outlet is less than the temperature setting on regulator 56, then the regulator 56 will energize heater 46 to increase the operating temperature of the gyro assembly. As can be seen in FIG. 1, the air paths 42, 43 and 44 all emanate from the air intake 36 after the air has been heated by the heater 46. If it is found that heater 46 is incapable of maintaining the desired operating temperature then auxiliary gyro heaters 52 may be energized to raise the operating temperature to the desired setting of the regulator 56. However, if the temperature sensor 48 senses a temperature which is higher than the setting of the regulator 56, it will de-energize heater 46 and fan 38 will continue to blow relatively cool air over the gyros thus reducing the operating temperature of the assembly.

It can thus be seen that here is provided a temperature control system which will maintain the gyro assembly at an optimum operating temperature without the many leads, temperature sensors and control circuits heretofore required.

Obviously many modifications and variations of the present invention are possible in the light of the above teachings. It is therefore to be understood that within the scope of the appended claims the invention may be practiced otherwise than as specifically described, in particular, the body 16 of the member 10 is above described as a casting. While casting is the preferred method of fabrication, other methods are equivalent. The body may be a weldment, or an assembly of machined parts connected by screw fasteners, or fabricated according to other known methods of producing hollow rigid bodies.

What is claimed is:

1. A gyroscopic unit comprising a gyro assembly having an improved temperature control system which includes a stabilized member, said stabilized member being formed by a hollow body, a plurality of floating gyros operably mounted in said body, an air intake in said body, at least one air outlet from said body so disposed as to pass exhausting air about the periphery of at least one of said gyros, a motor driven fan mounted in said intake, first heating means mounted immediately downstream of said fan, sensing means mounted at said outlet and adjacent said one of said gyros, auxiliary heating means for maintaining a uniform operating temperature, a regulator operably connected to said first heating means, said auxiliary heating means, said sensing means and a source of power current whereby a uniform operating temperature of said gyro assembly may be maintained.

2. In a gyroscopic unit comprising a gyro assembly having an improved temperature control system, said temperature control system including a stabilized member which is formed by a substantially symmetrical hexahedral body, a pair of stub shafts protruding from a pair of opposite corners of said hexahedral body, said body having a hollow center portion, a plurality of floating gyros operably mounted to said body in individual openings provided in said body, an air intake opening in said body, at least one air outlet from said body so disposed as to pass exhausting air about the periphery of at least one of said gyros, a motor driven fan operably mounted in said intake opening, first heating means mounted immediately downstream of said fan, sensing means mounted at said outlet and adjacent said one of said gyros, auxiliary heating means for maintaining a uniform operating temperature, a regulator operably connected to said first heating means, said auxiliary heating means, said sensing means and a source of power current whereby a uniform operating temperature of said gyro assembly may be maintained.

3. A gyroscopic unit as described in claim 2 wherein said auxiliary heating means comprises a plurality of heating elements which are disposed at various predetermined locations on the outer periphery of said body for controlled energization to effect an increase in the operating temperature of the air within the gyro assembly by heat conduction through said body.

4. A gyroscopic unit as described in claim 2 wherein said sensing means comprises a temperature sensing element located at the outlet of one of said gyros for indicating the ambient temperature of the air leaving the gyro assembly.

5. A gyroscopic unit of the character described in claim 3 wherein said control system comprising said regulator is operably connected to a power supply, and wherein said heating means is selectably energized therefrom and said sensing means is maintained continuously in a condition of sensitivity to temperature variations ambient thereto whereby said heating means will be energized when said sensing means senses a temperature which is less than the desired operating temperature.

References Cited in the file of this patent

UNITED STATES PATENTS

| | | |
|---|---|---|
| 2,308,234 | Brennan | Jan. 12, 1943 |
| 2,825,789 | Scott | Mar. 4, 1958 |
| 3,004,436 | Katz | Oct. 17, 1961 |
| 3,005,352 | Claret | Oct. 24, 1961 |